(12) United States Patent
Chapman et al.

(10) Patent No.: US 7,699,587 B2
(45) Date of Patent: Apr. 20, 2010

(54) COOLING CHANNEL FOR AUTOMOTIVE HVAC BLOWER ASSEMBLY

(75) Inventors: Thomas Richard Chapman, Templeton, MA (US); Robert Hodgson White, Jr., Roslindale, MA (US)

(73) Assignee: Robert Bosch GmbH, Stuttgart (DE)

( * ) Notice: Subject to any disclaimer, the term of this patent is extended or adjusted under 35 U.S.C. 154(b) by 954 days.

(21) Appl. No.: 11/345,478

(22) Filed: Feb. 1, 2006

(65) Prior Publication Data
US 2007/0177996 A1 Aug. 2, 2007

(51) Int. Cl.
*F04B 39/06* (2006.01)

(52) U.S. Cl. .................. 417/370; 417/366; 417/369; 417/371; 417/372; 417/423.1; 417/423.14; 415/175; 415/204; 415/206; 310/89

(58) Field of Classification Search .......... 417/366, 417/369, 370, 371, 372, 423.1, 423.14; 415/175, 415/176, 203, 204, 206; 310/89
See application file for complete search history.

(56) References Cited

U.S. PATENT DOCUMENTS

| | | | |
|---|---|---|---|
| 3,878,809 A | 4/1975 | Ray | |
| 4,167,683 A | 9/1979 | Hallerbäck et al. | |
| 4,186,317 A | 1/1980 | Sisk | |
| 4,856,971 A | 8/1989 | Koble, Jr. | |
| 4,958,988 A * | 9/1990 | Regev | 417/53 |
| 5,236,306 A * | 8/1993 | Hozak | 416/93 R |
| 5,243,244 A | 9/1993 | Kasberger et al. | |
| 5,929,544 A | 7/1999 | Maekawa et al. | |
| 6,107,708 A * | 8/2000 | Yamaguchi et al. | 310/58 |
| 6,563,240 B2 | 5/2003 | Lin et al. | |
| 6,604,906 B2 * | 8/2003 | Ozeki et al. | 415/204 |
| 6,703,730 B2 | 3/2004 | Hayashi | |
| 6,717,299 B2 | 4/2004 | Bacile et al. | |
| 6,755,615 B2 * | 6/2004 | Chapman | 415/206 |
| 6,802,699 B2 * | 10/2004 | Mikami et al. | 417/369 |
| 6,831,382 B1 | 12/2004 | Lyle et al. | |
| 6,831,435 B2 * | 12/2004 | Suzuki | 318/483 |
| 7,011,506 B2 * | 3/2006 | Kim | 417/366 |

(Continued)

FOREIGN PATENT DOCUMENTS

DE 4220669 C1 7/1993

(Continued)

OTHER PUBLICATIONS

European Office Action issued Feb. 16, 2009 covering European Patent Application No. 07 717 277.3, corresponds to U.S. Appl. No. 11/345,478, 3 pages.

*Primary Examiner*—Devon C Kramer
*Assistant Examiner*—Leonard J Weinstein
(74) *Attorney, Agent, or Firm*—Michael Best & Friedrich LLP

(57) ABSTRACT

A centrifugal blower comprising a cooling air path having an inlet communicating with a blower space and an outlet communicating with the inlet of the motor airflow path, the cooling air path having an upstream portion that extends axially in the direction from the opposite end of the motor toward the drive end of the motor, and the cooling air path having a downstream portion that extends axially in the direction from the drive end of the motor toward the opposite end of the motor.

53 Claims, 11 Drawing Sheets

U.S. PATENT DOCUMENTS

| | | | |
|---|---|---|---|
| 2001/0052733 A1 * | 12/2001 | Fujii et al. | 310/58 |
| 2002/0025253 A1 * | 2/2002 | Ozeki et al. | 415/206 |
| 2003/0210981 A1 * | 11/2003 | Kim | 415/182.1 |
| 2004/0219013 A1 * | 11/2004 | Hopfensperger | 415/206 |
| 2004/0263009 A1 | 12/2004 | Noda et al. | |
| 2005/0099070 A1 * | 5/2005 | Shimasaki et al. | 310/58 |

FOREIGN PATENT DOCUMENTS

| | | |
|---|---|---|
| JP | 61077512 A | 4/1986 |
| JP | 02151519 A | 6/1993 |

* cited by examiner

COOLING CHANNEL FOR AUTOMOTIVE HVAC BLOWER ASSEMBLY

FIELD OF THE INVENTION

This invention relates generally to centrifugal blowers, and more particularly to centrifugal blowers for use in automotive climate control systems.

BACKGROUND OF THE INVENTION

Centrifugal blowers typically include impellers having a plurality of blades that redirect an incoming airflow toward a radial direction as the airflow moves from the impeller inlet to the impeller outlet. The blades are typically attached to a hub for rotation therewith. An electric motor rotates the impeller at the required speed. The electric motor requires cooling and therefore has an airflow path through the motor.

In automotive climate control applications (i.e., heating, ventilation, and air conditioning), water can enter the inlet of a climate control blower assembly. The water must be prevented from propagating from the blower inlet to the inner workings of the electric motor. Some previous methods to prevent water from entering the motor have been unsuccessful; others, while successful, require the motor cooling air path to be created by joining the blower assembly to the main climate control module that includes the volute.

Other cooling air paths involve positioning the cooling hole or inlet high in the volute, just downstream of the volute tongue. The path then turns downward towards the motor flange where the motor flange assembles to the volute. The motor flange and a cover/cap piece then form the rest of the air path towards the bottom of the motor. The high position of the cooling path inlet is effective at preventing water from entering, but the cooling path design requires design details in both the volute and the blower assembly.

SUMMARY OF THE INVENTION

The present invention provides a motor cooling air path that prevents water from entering the motor, even if the assembly is tilted up to twenty-five degrees from its installed position. This is achieved by designing the air path with an incline or change in elevation that prevents water from traveling over the top of the incline and into the motor. The pressure differential between the cooling path inlet in the volute and outlet at the drive end of the motor drive the air over the incline and through the motor.

The invention provides a means of preventing water from entering the motor and is self-contained in the blower assembly. This allows the blower assembly to be used in different HVAC modules without the HVAC module manufacturer needing to modify its parts to accommodate the blower motor cooling requirement.

The invention also provides a centrifugal blower comprising a centrifugal fan including a hub adapted for rotation about a central axis, and a plurality of blades coupled for rotation with the hub. The blower also comprises a motor having a drive end and an opposite end, the motor including a drive shaft drivingly connected to the hub of the centrifugal fan, the drive shaft extending from the drive end of the motor, and the motor having therethrough a motor airflow path for cooling the motor, the motor airflow path having an inlet near the opposite end of the motor. The blower also comprises housing structure including a blower housing portion at least partially defining a space in which the fan is substantially enclosed, the space having an inlet and an outlet. The housing structure also includes a motor housing portion supporting the motor, and a flange portion at least partially supporting the motor housing portion on the blower housing portion. The housing structure also includes a cooling air path having an inlet communicating with the space and an outlet communicating with the inlet of the motor airflow path, the cooling air path having an upstream portion that extends axially in the direction from the opposite end of the motor toward the drive end of the motor, and the cooling air path having a downstream portion that extends axially in the direction from the drive end of the motor toward the opposite end of the motor.

The invention also provides a method of mounting a centrifugal blower in a vehicle, the method comprising providing a centrifugal blower as described above, and mounting the blower in a vehicle such that the central axis extends non-vertically and non-horizontally, and such that the inlet of the cooling air path is substantially directly below the axis.

Other features and aspects of the present invention will become apparent to those skilled in the art upon review of the following detailed description, claims and drawings.

BRIEF DESCRIPTION OF THE DRAWINGS

In the drawings, wherein like reference numerals indicate like parts.

Figure 1:
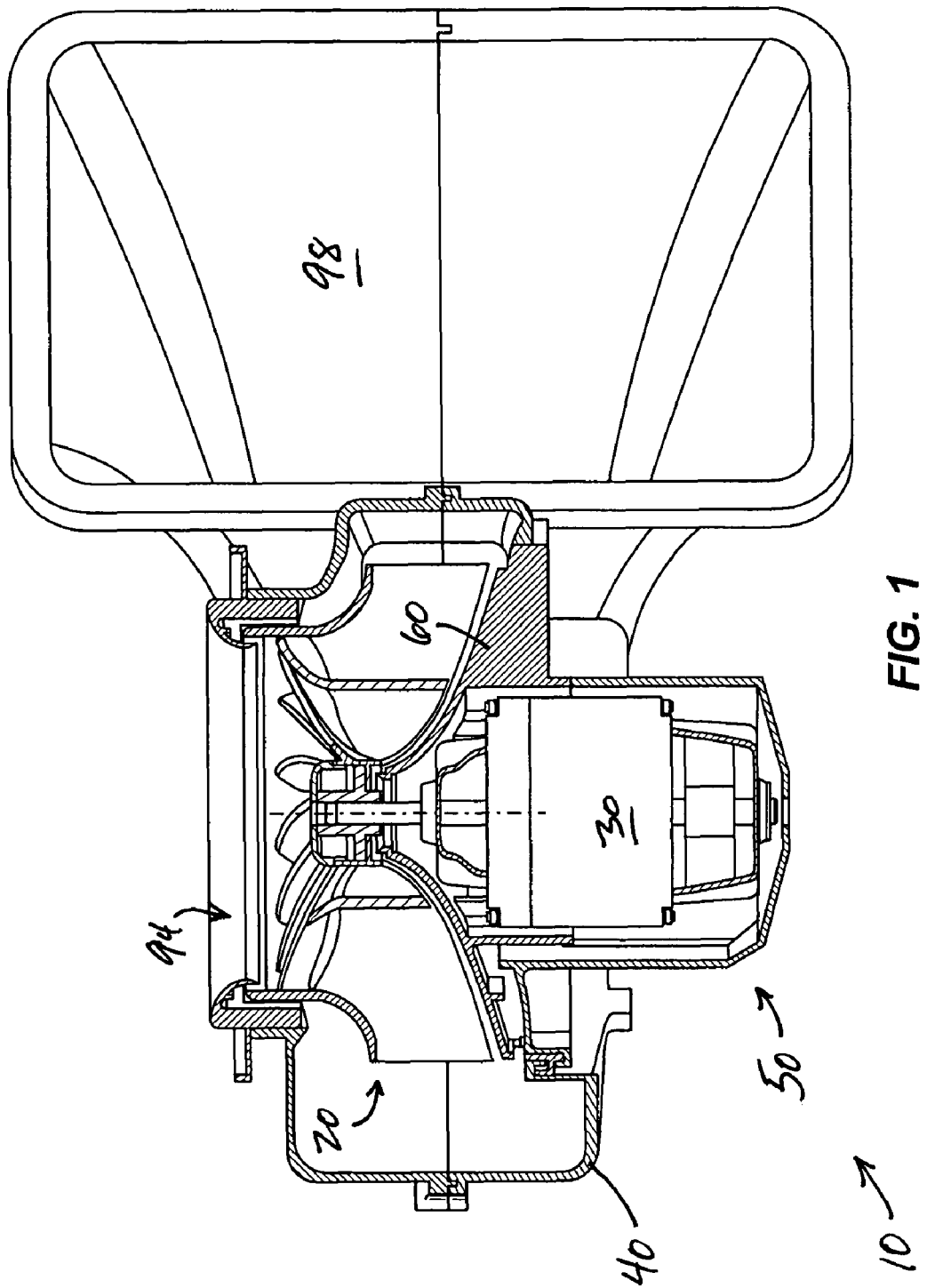
FIG. 1 is an elevational view, partially in section, of a centrifugal blower embodying the invention.

Before any features of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of letters to identify elements of a method or process is simply for identification and is not meant to indicate that the elements should be performed in a particular order.

DETAILED DESCRIPTION

Figure 2:
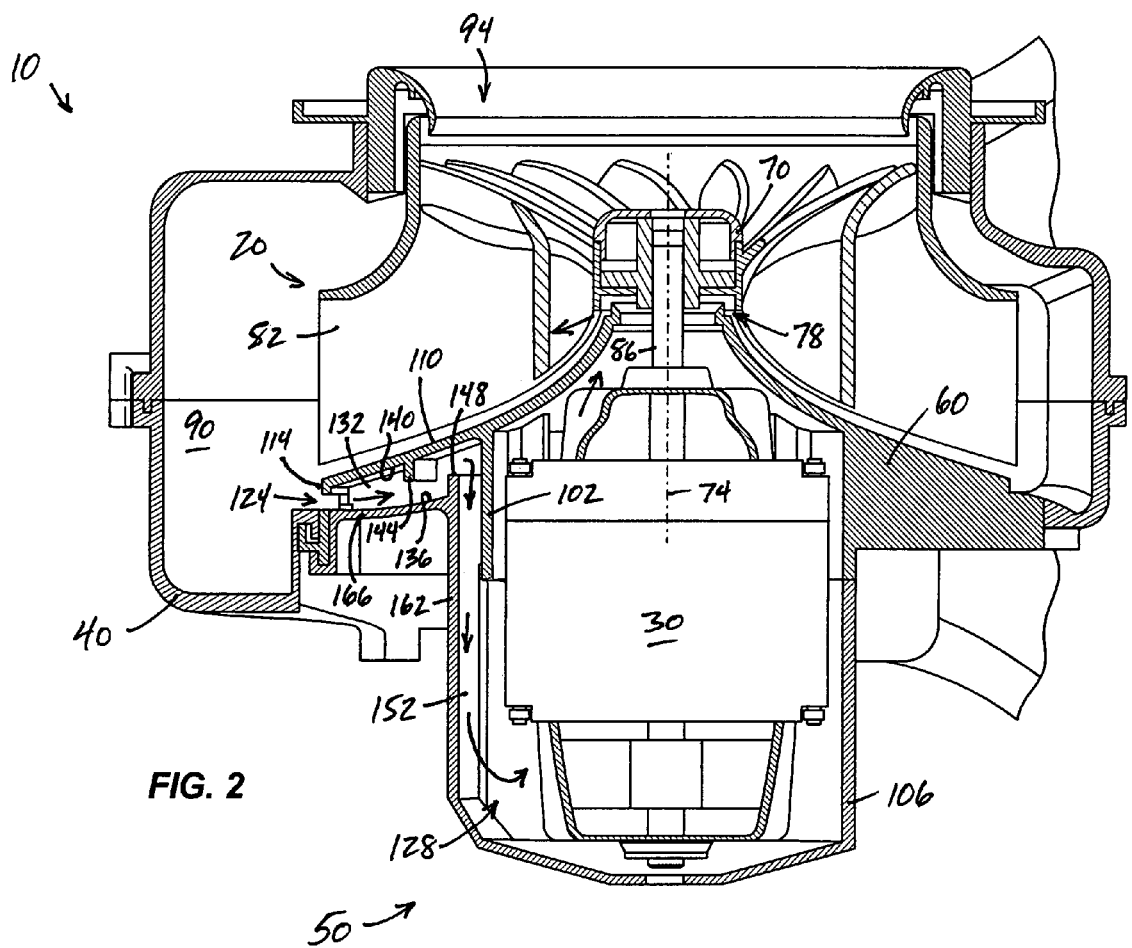
FIG. 2 is an enlarged portion of FIG. 1.

A centrifugal blower 10 embodying the invention is illustrated in FIGS. 1 and 2. The blower 10 comprises a centrifugal fan 20, a motor 30 drivingly connected to the fan 20, a blower housing 40, a motor housing 50 and a motor flange 60. The foregoing components of a centrifugal blower are well known in the art. It is understood by those skilled in the art that the blower housing 40, motor housing 50 and motor flange 60 can have various constructions and can be formed in many ways, such that any parts can be formed separate or integrally. Also, the blower 10 can be mounted in a vehicle in various ways.

Referring to FIG. 2, the centrifugal fan 20 includes a hub 70 that rotates about a central axis 74. The motor flange 60 and the hub 70 define therebetween an axial gap 78, the significance of which is explained below. The fan 20 also includes a plurality of blades 82 coupled for rotation with the hub 70. The illustrated fan is only one type of fan to which the invention applies. The invention is also applicable, for example, to a forward curved fan.

The motor 30 has a drive end (the upper end in FIG. 1) and an opposite end (the lower end in FIG. 1). The motor 30 includes a drive shaft 86 that extends from the drive end of the motor and along the axis 74 and that is drivingly connected to the hub 70 of the fan 20. The motor 30 has therethrough an airflow path for cooling the motor. The motor airflow path has an inlet near the lower end of the motor 30 and an outlet near the upper end of the motor.

The blower housing 40 cooperates with the motor flange 60 to form a volute or scroll, as is known in the art. The volute defines a space 90 in which the fan 20 is substantially enclosed, the space 90 having an inlet 94 and an outlet 98 (FIG. 1), which are the inlet and outlet of the blower 10. It is understood by those skilled in the art that the volute can be defined by the blower housing alone, or in other ways.

The motor housing 50 supports the motor 30. In the illustrated construction, the motor housing 50 is defined in part by the motor flange 60. More particularly, a generally cylindrical part 102 of the motor flange 60 extends downwardly around the upper part of the motor 30. The motor housing 50 also includes a separate cover 106 that extends in part over the lower end of the motor 30.

The motor flange 60 is connected to the blower housing 40 and cooperates with the blower housing to form the volute, as described above. Specifically, the motor flange 60 has a generally bell-shaped surface 110 that forms part of the volute and that is in closely-spaced, facing relationship with the lower edges of the fan blades. The motor flange 60 also has a generally cylindrical surface 114 that extends generally parallel to, or is centered on, the axis 74, and that extends downwardly from the lower end of the bell-shaped surface 110.

Figure 5:
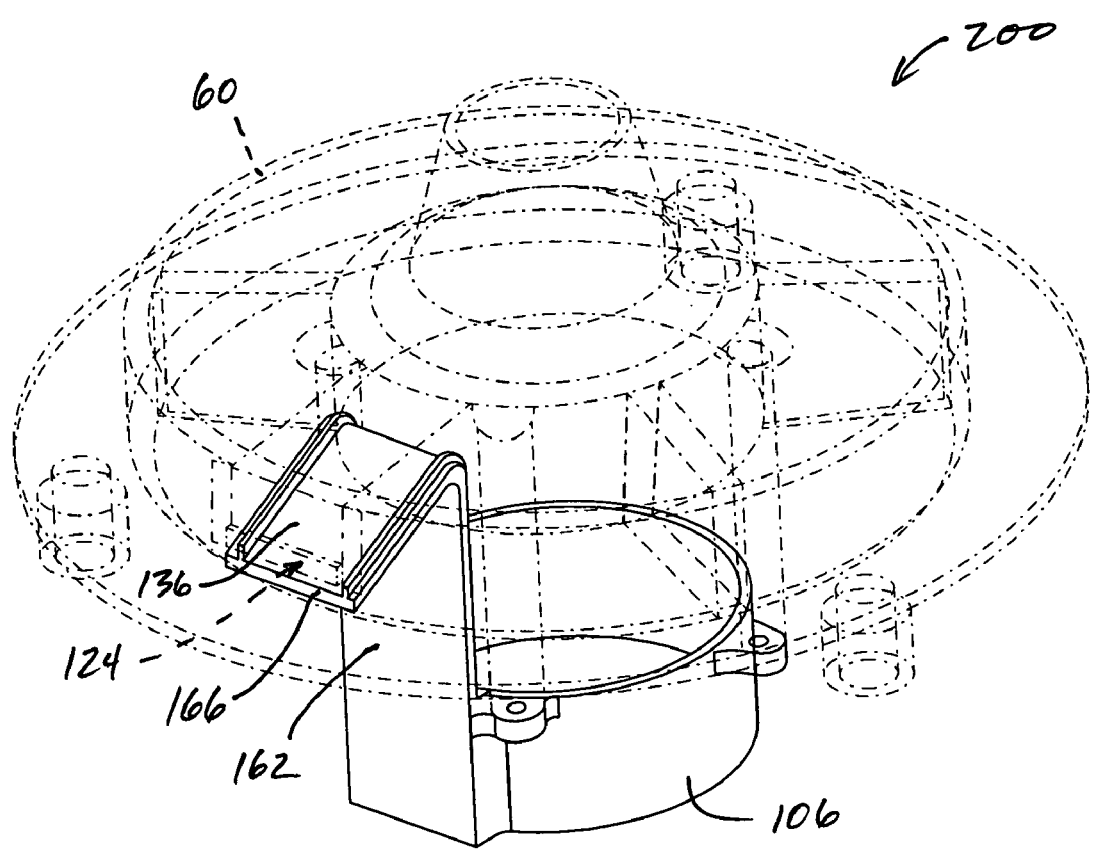
FIG. 5 is a partially transparent perspective view of the cooling channel of FIG. 3.
Figure 14:
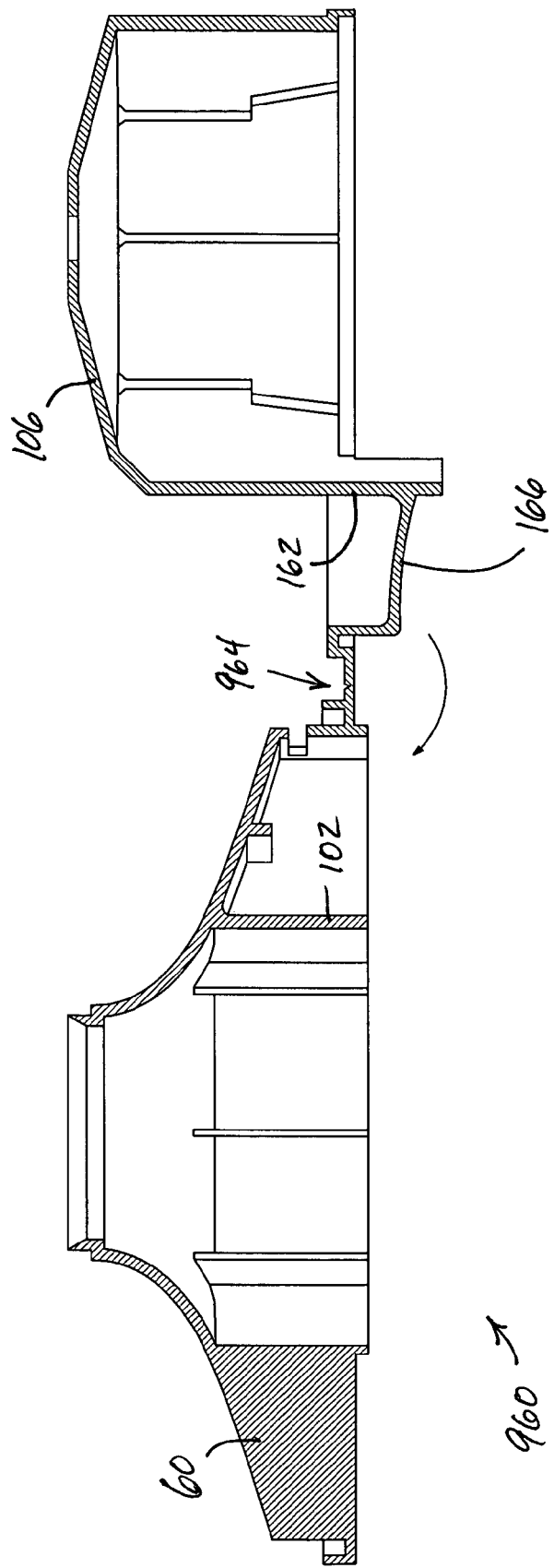
FIG. 14 is a partial sectional view of an alternative blower with the cover in an open position.

The blower 10 also includes a cooling air path (indicated by the arrows in FIG. 2) defined in the illustrated construction by the motor flange 60 and by the cover 106. It will be understood by those skilled in the art that the cooling air path could be defined by other parts of the blower. The cooling air path has an inlet 124 located in the surface 114 of the motor flange 60, so that the inlet 124 communicates with the interior space 90 of the volute. In the illustrated construction, the inlet 124 is located near the upper edge of the surface 114. In alternative embodiments, the inlet can be located near the lower edge of the surface 114, or somewhere in between. FIG. 5, for example, shows the inlet 124 near the lower edge of the surface, while FIG. 14 shows another construction with the inlet 124 near the upper edge of the surface.

The cooling air path also has an outlet 128 communicating with the inlet of the motor airflow path, i.e., with the cooling air inlet of the motor 30. Between the inlet 124 and the outlet 128, the cooling air path has an upstream portion 132 that extends radially inwardly and axially upwardly from the inlet 124. The upstream portion 132 of the cooling air path is defined in part by a ramped surface 136 on the cover 106, and in part by a generally downwardly facing surface 140 on the motor flange 60. The upstream portion 132 of the cooling air path also includes a wall 144 that extends downwardly toward and terminates at a point spaced above the ramped surface 136. The upstream portion 132 further includes a dam 148 that extends upwardly from the ramped surface 136 at the innermost end of the ramped surface 136. The dam 148 and the wall 144 create a labyrinth structure that resists downstream water flow in the upstream portion 132 of the cooling air path. Referring to FIG. 2, the upstream portion 132 has a low point adjacent the inlet 124 and a high point adjacent the downstream or innermost end of the upstream portion 132. In the illustrated construction the high point is defined by the top of the dam 148, but the high point can, in alternative constructions, be defined by other structure. Also, it should be understood that the dam 148 does not have to be located at the innermost end of the ramped surface 136. A line from the low point to the high point defines an angle of greater than approximately ten degrees with respect to horizontal, and preferably greater than about twenty degrees.

The cooling air path also has a downstream portion 152 that extends axially or downwardly from the radially inward end of the upstream portion 132, and that extends substantially the entire length of motor 30. The downstream portion 152 is defined on the outside by the cover 106 and on the inside by the cylindrical portion 102 of the flange 60 and by the motor 30. More particularly, the cover 106 includes an axial portion 162 that extends upwardly and over the cylindrical portion 102 of the motor flange 60. Extending outwardly and downwardly from the upper end of the axial portion 162 is an angled portion 166 that includes the ramped surface 136.

The cooling air path substantially prevents water from entering the motor 30, even if the blower 10 is tilted up to twenty-five degrees (in any direction) from its installed position.

Cooling air exiting the motor 30 via cooling air outlets at the upper end of the motor flows through a second cooling air path that includes the axial gap 78 between the upper end of the flange 60 and the fan hub 70.

Figure 3:
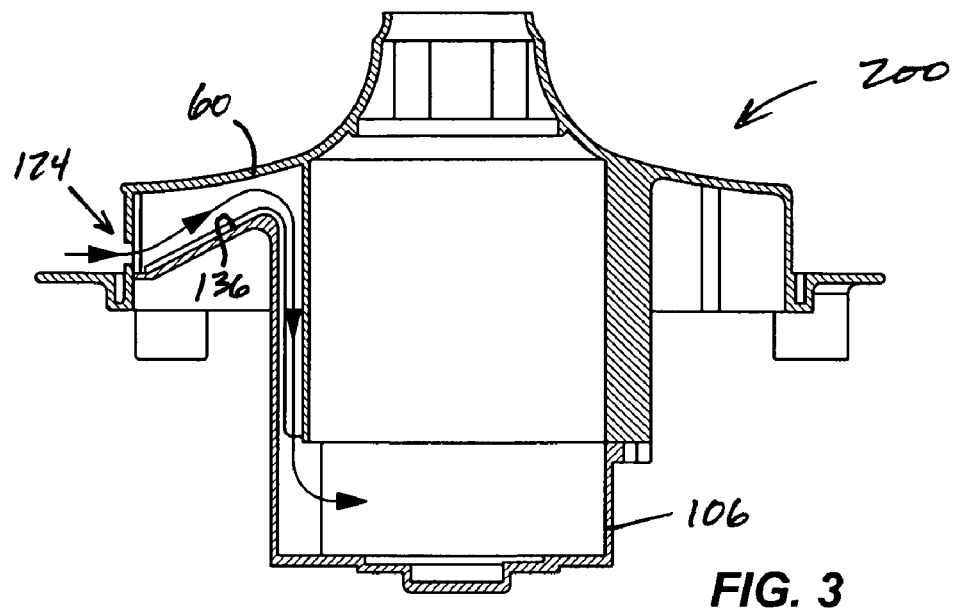
FIG. 3 is a cut-out view of the cooling channel of a blower that is another embodiment of the invention, with the motor holder oriented vertically, illustrating the motor cooling air path.
Figure 4:
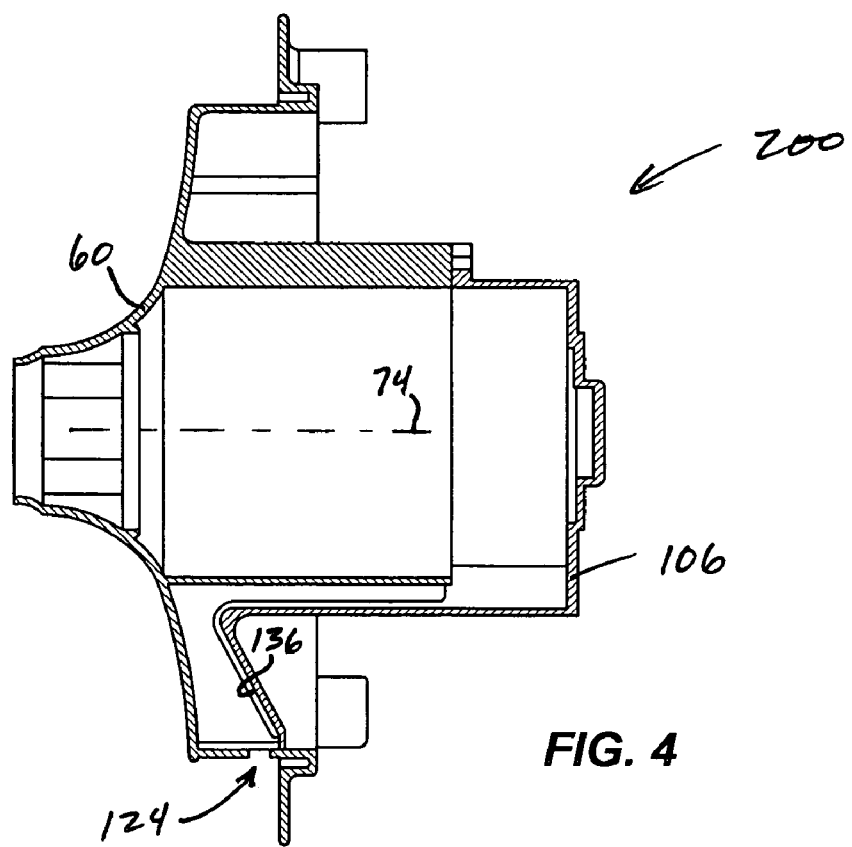
FIG. 4 is a cut-out view of the cooling channel of FIG. 3, with the motor holder oriented horizontally, with the motor cooling hole facing downward.

FIGS. 3 through 5 partially illustrate another embodiment of the invention. Common elements have been given the same reference numerals, although the construction of the common elements may differ somewhat. A blower assembly 200 includes two parts, a motor flange 60 and an end cover or cap 106. These two parts are assembled to form an enclosed cooling air path from the volute to the end of the motor 30 opposite the drive shaft. FIG. 3 shows the direction of the cooling airflow. FIG. 3 shows the cover 106 forming an inclined surface 136 which starts at a low elevation at the inlet end 124 of the cooling channel and which then progresses to a higher elevation before turning again towards the "bottom" of the motor. The direction of gravity is downward in FIG. 3. Other embodiments of the invention do not require an inclined surface, but simply a motor cooling air path that has a change in elevation, preventing water from propagating towards the motor. The greater the change in elevation, the greater the assembly can be tilted (as in a manufacturer's validation test) and prevent water from entering the motor.

Many automotive HVAC blower assemblies are oriented as in FIG. 3, with the motor shaft vertical. Others are oriented with the motor shaft horizontal as in FIG. 4. In FIG. 4 the cooling hole or inlet 124 is positioned facing downward, but can in fact be positioned in any direction when the axis 74 is horizontal. When the blower assembly 200 is in the horizontal orientation, water must enter through the fan inlet 94. The water then falls down towards the outer wall of the volute and away from the inner wall of the volute where the motor cooling hole is located.

If the blower is positioned with the axis 74 other than horizontal or vertical, it is preferable to have the inlet 124 directly below the axis 74, or in its lowermost possible position. This lowermost position can also be described as having the inlet 124 below the axis 74 and in a vertical plane (e.g., the plane of the paper in FIG. 4) including the axis 74. Putting the inlet 124 in this lowermost position minimizes the likelihood of water entering the inlet 124, because any water that has entered the blower inlet 94 will tend to flow away from the cooling air path inlet 124, which in its lowermost position faces at least somewhat downwardly. It is possible, in other embodiments, to deviate slightly from having the inlet 124 directly below the axis 74. In some embodiments the inlet 124 can be located in a second plane including the axis 74, with the angle between the second plane and the vertical plane of the axis 74 being less than about fifteen degrees. In other words, the blower can be rotated about the axis 74 up to about fifteen degrees in either direction.

Figure 6:
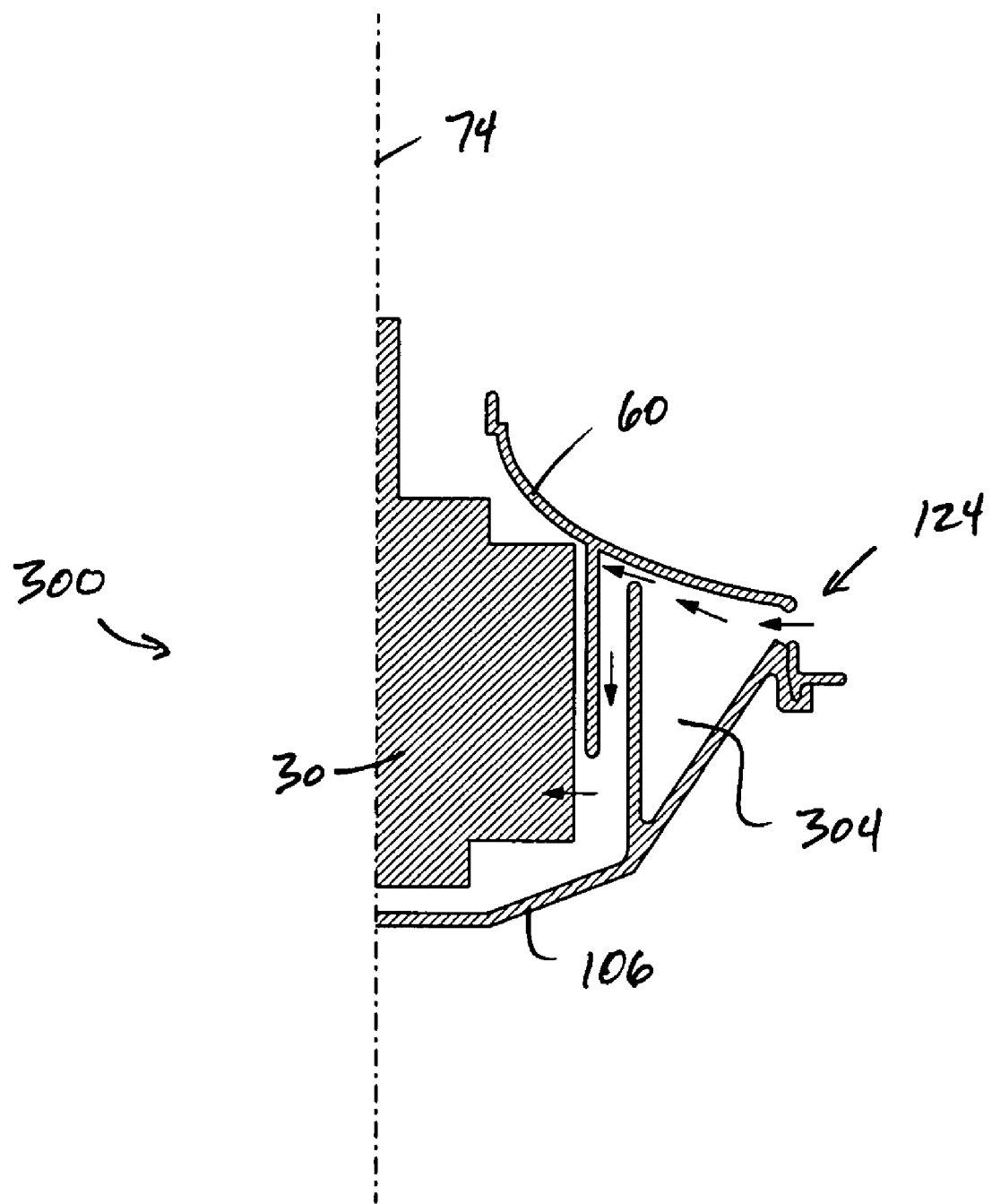
FIG. 6 is a partial sectional view of a blower that is another embodiment of the invention.

FIG. 6 shows an alternative blower 300. Common elements again have the same reference numerals. The blower 300 has a cooling air path (indicated by arrows) including a water reservoir 304 adjacent the cooling air path inlet 124. The water reservoir 304 collects water that may enter the inlet to further prevent water from passing through the cooling air path.

Figure 7:
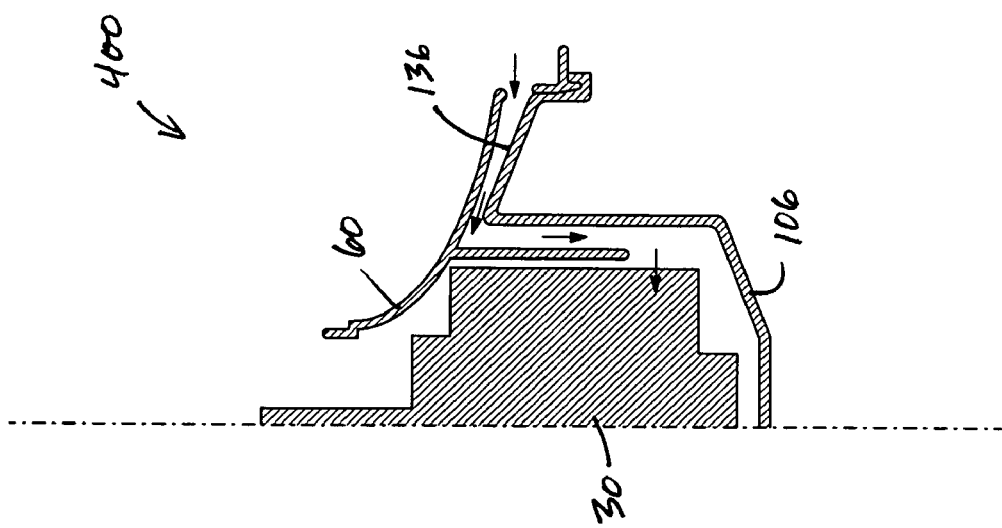
FIG. 7 is a partial sectional view of a blower that is another embodiment of the invention.

FIG. 7 shows an alternative blower 400. The upstream portion 132 of the cooling air path has a ramped surface 136 but no dam or wall.

Figure 8:
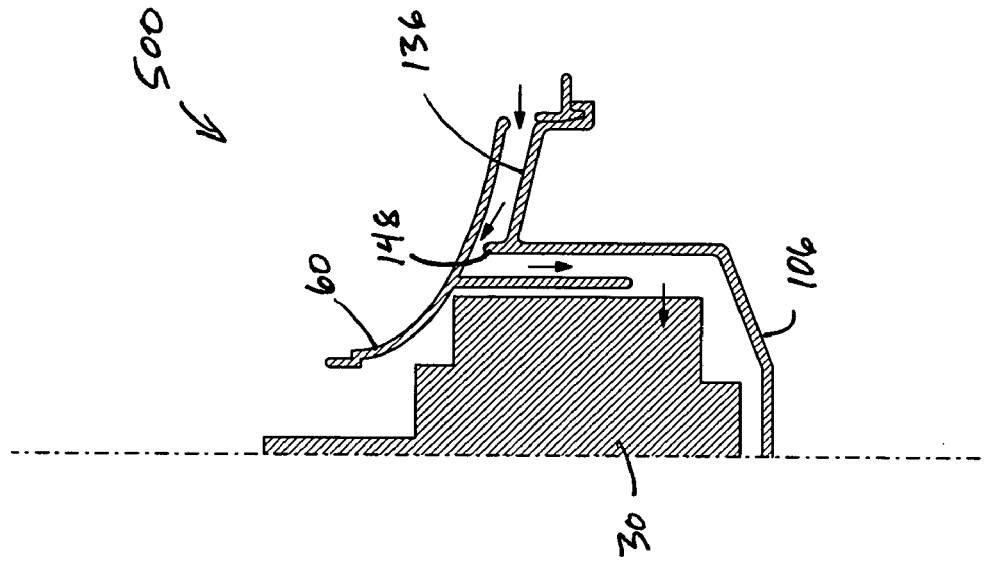
FIG. 8 is a partial sectional view of a blower that is another embodiment of the invention.

FIG. 8 shows an alternative blower 500. The upstream portion 132 of the cooling air path has a ramped surface 136 and a dam 148, but no wall.

Figure 9:
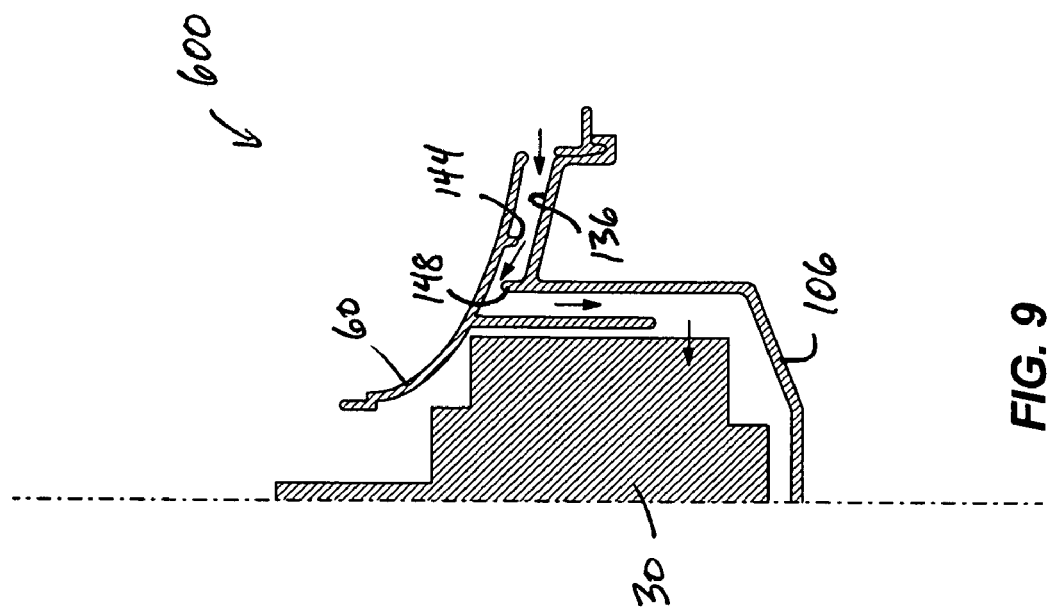
FIG. 9 is a partial sectional view of a blower that is another embodiment of the invention.

FIG. 9 shows an alternative blower 600. The upstream portion 132 of the cooling air path has a ramped surface 136, a dam 148 and a wall 144.

Figure 10:
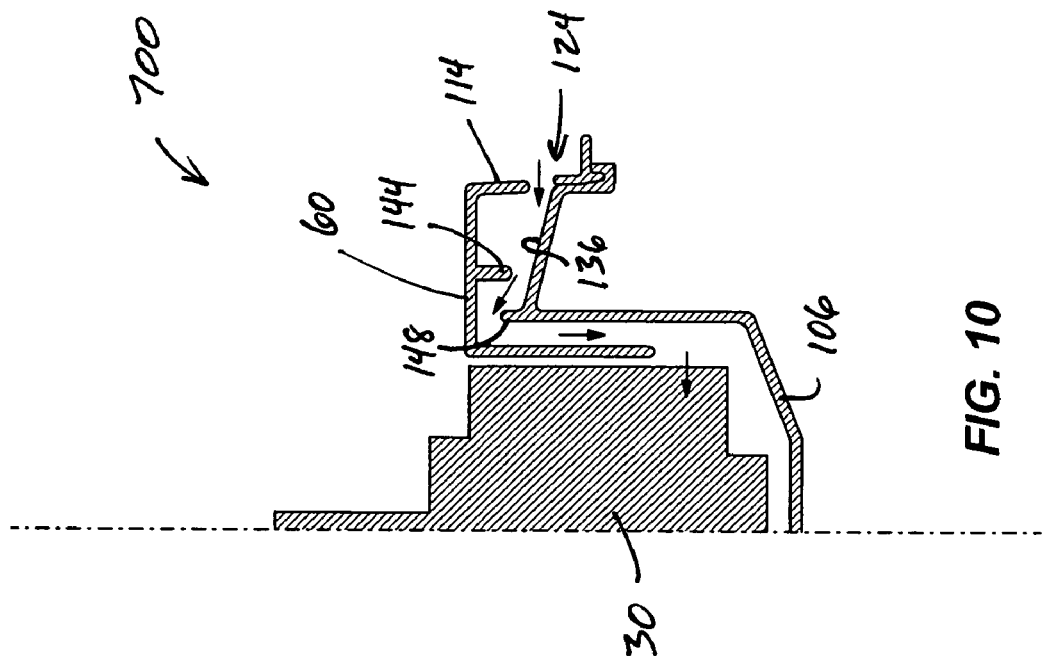
FIG. 10 is a partial sectional view of a blower that is another embodiment of the invention.

FIG. 10 shows an alternative blower 700. The "roof" of the upstream portion 132 is generally horizontal, resulting in a longer wall 144. Also, the inlet 124 is located near the bottom of the surface 114. This type of flange construction is especially well suited for use with a forward curved fan.

Figure 11:
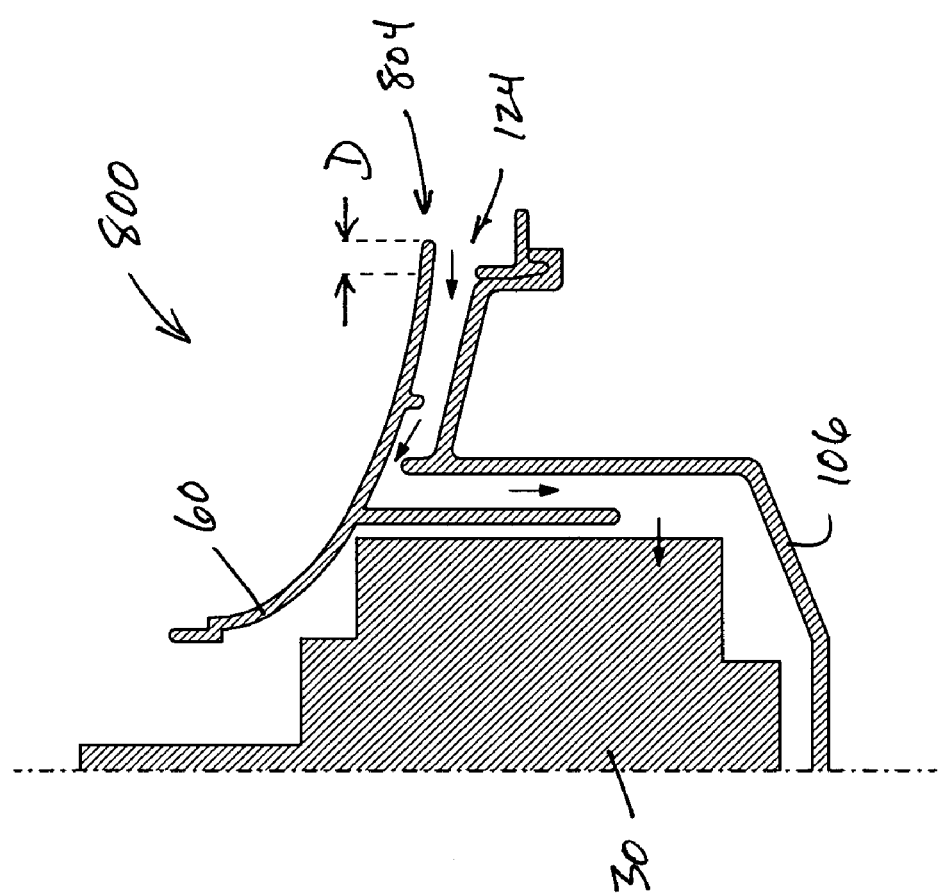
FIG. 11 is a partial sectional view of a blower that is another embodiment of the invention.

FIG. 11 shows another alternative blower 800. The flange 60 of the blower 800 has a portion 804 that extends locally over the inlet 124 of the cooling air path 132 to reduce ingestion of water in the cooling air path. This portion 804 extends a distance D farther than in other embodiments.

Figure 12:
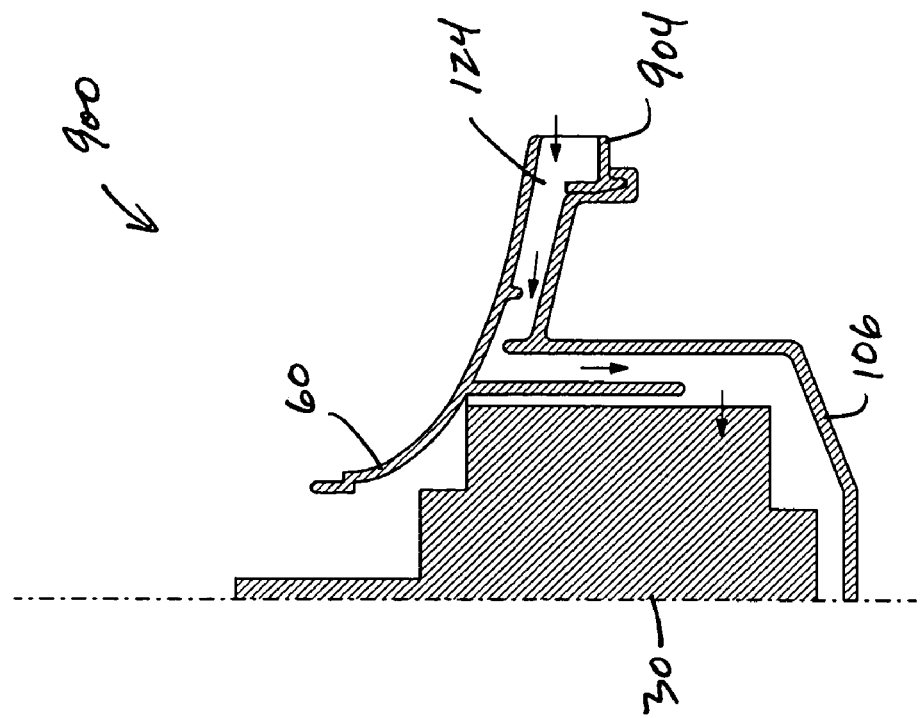
FIG. 12 is a partial sectional view of a blower that is another embodiment of the invention.
Figure 13:
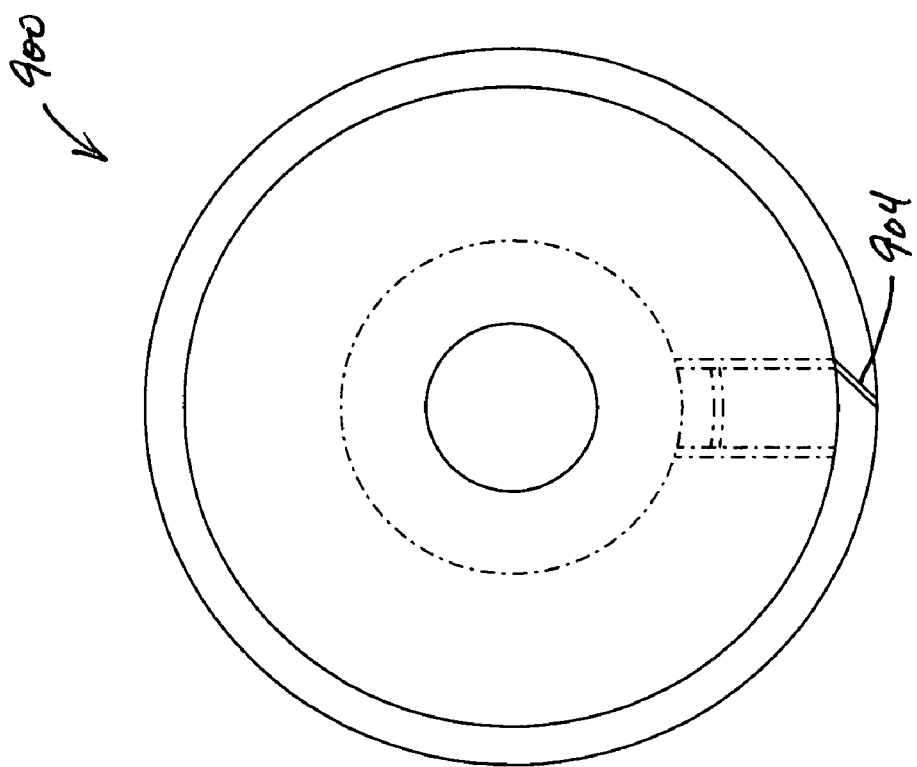
FIG. 13 is a partial top plan view of the blower of FIG. 12.

FIGS. 12 and 13 show another alternative blower 900. The flange 60 of the blower 900 has an air scoop 904 adjacent the inlet 124 of the cooling air path. In the event static pressure in the volute in insufficient to cause adequate air flow through the cooling air path, the scoop 904 will take advantage of the movement of the air and direct the air into the cooling air path to provide adequate air flow.

Figure 15:
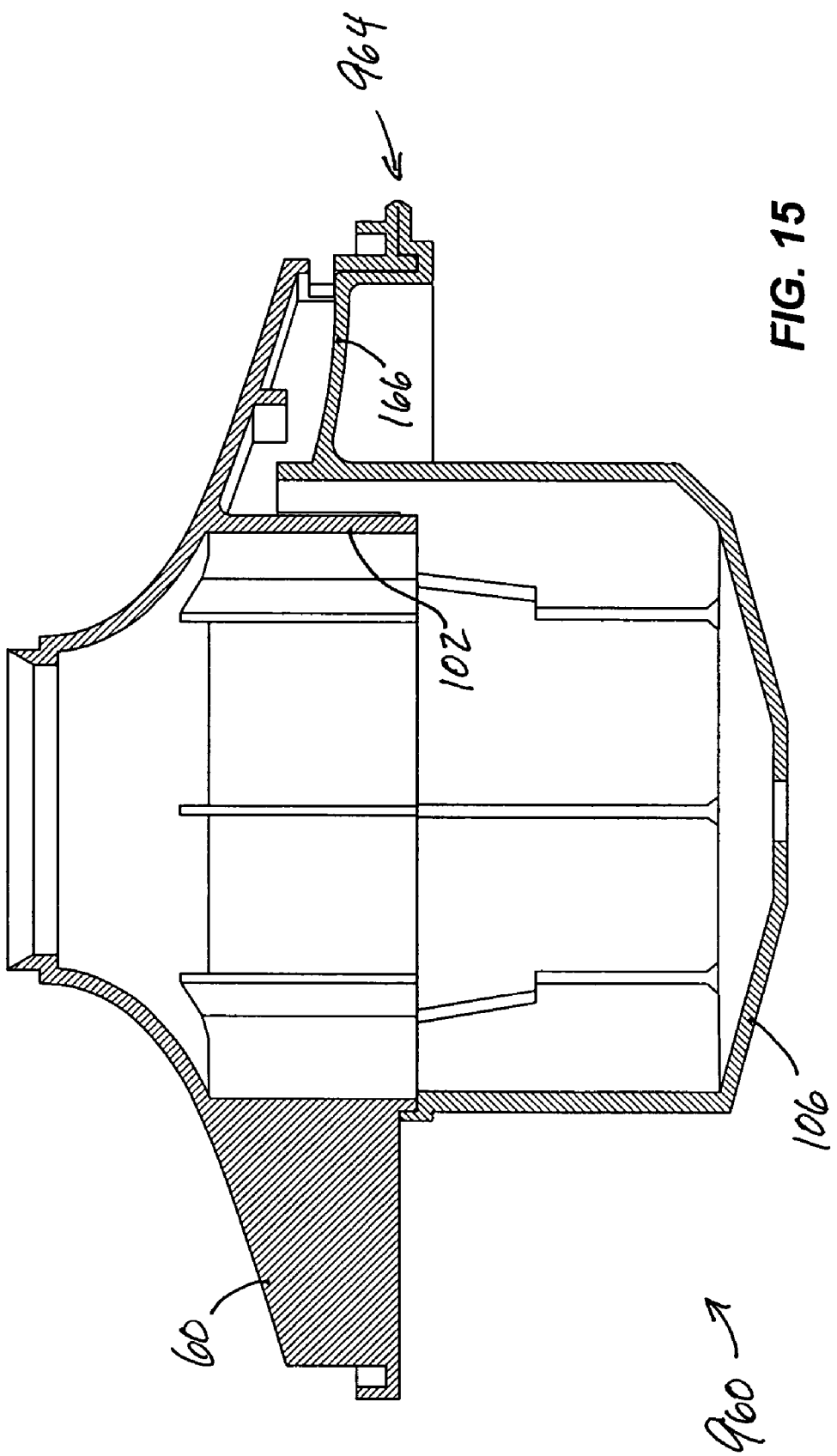
FIG. 15 is a view of the blower of FIG. 14 with the cover in its closed position.

FIGS. 14 and 15 partially illustrate another alternative blower 960. In the blower 960, the motor housing 50, including the cover 106, is integral with the flange 60. In the illustrated construction, the cover 106 is formed integrally with the flange 60, including the cylindrical portion 102, such as by injection molding. The cover 106 is connected to the flange 60 by a living hinge 964, and the cover is movable relative to the cylindrical portion 102 between an open position (FIG. 14) and a closed position (FIG. 15). The flange 60 is formed or molded with the cover 106 in its open position, which facilitates the molding process, as will be understood by those skilled in the art. The cover is moved to its closed position to enclose the motor 30 in the motor housing. A suitable fastening means, such as a snap-fit arrangement (not shown) between the cover 106 and the cylindrical portion 102, can be used to secure the cover in its closed position. The cover 106 includes the axial portion 162 and the angled portion 166.

We claim:

1. A centrifugal blower comprising:
a centrifugal fan including a hub adapted for rotation about a central axis, and a plurality of blades coupled for rotation with the hub;
a motor having a drive end and an opposite end, the motor including a drive shaft drivingly connected to the hub of the centrifugal fan, the drive shaft extending from the drive end of the motor, and the motor having therethrough a motor airflow path for cooling the motor, the motor airflow path having an inlet near the opposite end of the motor; and
a housing structure including
a blower housing portion at least partially defining a space in which the fan is substantially enclosed, the space having a blower inlet and a blower outlet;
a motor housing portion supporting the motor;
a flange portion at least partially supporting the motor housing portion on the blower housing portion; and
a cooling air path having a cooling air path inlet directly communicating with the space and a cooling air path outlet communicating with the inlet of the motor airflow path, the cooling air path having an upstream portion that extends axially in the direction from the opposite end of the motor toward the drive end of the motor, and the cooling air path having a downstream portion that extends axially in the direction from the drive end of the motor toward the opposite end of the motor, wherein no portion of the cooling air path between the cooling air path inlet and the cooling air path outlet is defined by the blower housing portion, and wherein the upstream portion of the cooling air path is positioned between the fan and a surface of the blower housing portion opposite the blower inlet and at least partially defining the space.

2. The blower of claim 1 wherein at least one of the blower housing portion, the motor housing portion, and the flange portion is formed separately from the other portions of the housing structure.

3. The blower of claim 1 wherein the flange portion also includes a surface in closely-spaced, facing relationship with at least a portion of the blades.

4. The blower of claim 1 wherein at least part of the motor housing portion is separate from the flange portion.

5. The blower of claim 4 wherein the motor housing portion is formed in part by a structure integral with the flange portion and in part by a separate cover which extends in part over the opposite end of the motor.

6. The blower of claim 5 wherein the cooling air path is defined by the flange portion and by the separate cover.

7. The blower of claim 1 wherein the motor airflow path has an outlet near the drive end of the motor, wherein the flange portion and the hub define therebetween an axial gap, and wherein the housing structure also includes a second cooling air path communicating between the outlet of the motor airflow path and the axial gap.

8. The blower of claim 1 wherein the motor has an axial length, and wherein the downstream portion of the cooling air path extends substantially the entire length of motor.

9. The blower of claim 1 wherein the upstream portion of the cooling air path also extends radially inwardly.

10. The blower of claim 1 wherein two of the housing structure portions are formed integrally.

11. The blower of claim 10 wherein the flange portion and at least part of the motor housing portion are formed integrally.

12. The blower of claim 1 wherein the cooling air path includes a water reservoir adjacent the cooling air path inlet.

13. The blower of claim 1 wherein the upstream portion of the cooling air path is defined in part by a ramped surface.

14. The blower of claim 13 wherein the ramped surface is on the motor housing portion.

15. The blower of claim 14 wherein the motor housing portion is formed in part by a structure integral with the flange portion and in part by a separate cover which extends in part over the opposite end of the motor, and wherein the ramped surface is on the cover.

16. The blower of claim 1 wherein the upstream portion of the cooling air path includes a raised dam that resists downstream water flow in the cooling air path.

17. The blower of claim 1 wherein the upstream portion of the cooling air path includes a wall that extends generally axially in the direction from the drive end of the motor toward the opposite end of the motor and that resists downstream water flow in the cooling air path.

18. The blower of claim 17 wherein the upstream portion of the cooling air path includes a raised dam that resists downstream water flow in the cooling air path.

19. The blower of claim 18 wherein upstream portion of the cooling air path is defined in part by a ramped surface, wherein the dam extends upwardly from the ramped surface, and wherein the wall extends toward and terminates at a point spaced from the ramped surface.

20. The blower of claim 1 wherein the housing structure extends locally over the cooling air path inlet to reduce ingestion of water in the cooling air path.

21. The blower of claim 1 wherein the housing structure forms an air scoop adjacent the cooling air path inlet.

22. The blower of claim 1 wherein the housing structure includes a housing surface that extends generally parallel to the central axis, and wherein the cooling air path inlet is in the housing surface.

23. The blower of claim 22 wherein the housing surface is on the flange portion.

24. The blower of claim 23 wherein the housing surface has upper and lower ends, the upper end being spaced from the lower end in the direction from the opposite end of the motor toward the drive end of the motor, and wherein the cooling air path inlet is located adjacent the upper end.

25. The blower of claim 23 wherein the housing surface has upper and lower ends, the upper end being spaced from the lower end in the direction from the opposite end of the motor toward the drive end of the motor, and wherein the cooling air path inlet is located adjacent the lower end.

26. The blower of claim 1 wherein the central axis extends generally vertically.

27. The blower of claim 1 wherein the upstream portion of the cooling air path includes a labyrinth structure that resists downstream water flow in the cooling air path.

28. The blower of claim 1 wherein, when the central axis is vertical, the upstream portion of the cooling air path has a low point adjacent the cooling air path inlet and has a high point adjacent a downstream end of the upstream portion, and wherein a line from the low point to the high point defines an angle of greater than approximately ten degrees with respect to horizontal.

29. The blower of claim 28 wherein the upstream portion of the cooling air path includes a raised dam that resists downstream water flow in the cooling air path, and wherein the high point is defined by the dam.

30. The blower of claim 1 wherein, when the central axis is vertical, the upstream portion of the cooling air path has a low point adjacent the cooling air path inlet and has a high point adjacent a downstream end of the upstream portion, and wherein a line from the low point to the high point defines an angle of greater than approximately twenty-five degrees with respect to horizontal.

31. The blower of claim 1 wherein the motor housing portion is formed in part by a structure integral with the flange portion and in part by a separate cover which extends in part over the opposite end of the motor, and wherein the cooling air path is defined by the flange portion and by the separate cover.

32. The blower of claim 31 wherein the flange portion includes a cylindrical portion partially surrounding the motor, and wherein the cover includes an axial portion that extends over the cylindrical portion of the flange portion.

33. The blower of claim 32 wherein the cover also includes an angled portion extending radially outwardly and axially in the direction from the drive end of the motor toward the opposite end of the motor, the angled portion partially defining the upstream portion of the cooling air path.

34. The blower of claim 1 wherein the motor housing portion is integral with the flange portion and includes a cover which extends over the opposite end of the motor, and wherein the cooling air path is defined by the flange portion.

35. The blower of claim 34 wherein the flange portion includes a cylindrical portion partially surrounding the motor, and wherein the cover is formed integrally with the cylindrical portion and is connected to the cylindrical portion by a living hinge such that the cover is movable relative to the cylindrical portion between open and closed positions.

36. The blower of claim 35 wherein the cover includes an axial portion that extends over the cylindrical portion of the flange portion when the cover is in the closed position.

37. The blower of claim 36 wherein the cover also includes an angled portion that, when the cover is in the closed position, extends radially outwardly and axially in the direction from the drive end of the motor toward the opposite end of the motor, so that the angled portion partially defines the upstream portion of the cooling air path.

38. The blower of claim 1 wherein the flange portion includes a bell-shaped surface in facing relationship with the blades.

39. The blower of claim 1 wherein at least a portion of the downstream portion of the cooling air path is defined by the flange portion and the motor housing portion.

40. A centrifugal blower comprising:
a centrifugal fan including a hub adapted for rotation about a central axis, and a plurality of blades coupled for rotation with the hub;
a motor having a drive end, an opposite end and an axial length, the motor including a drive shaft drivingly connected to the hub of the centrifugal fan, the drive shaft extending from the drive end of the motor, and the motor having therethrough a motor airflow path for cooling the motor, the motor airflow path having a motor airflow path inlet near the opposite end of the motor and the motor airflow path having a motor airflow path outlet near the drive end of the motor; and a housing structure including
  a blower housing portion at least partially defining a space in which the fan is substantially enclosed, the space having a blower inlet and a blower outlet;
  a motor housing portion supporting the motor;
  a flange portion at least partially supporting the motor housing portion on the blower housing portion, the flange portion and the hub defining therebetween an axial gap, and the flange portion including a surface that extends generally parallel to the central axis;
  a separate cover which extends in part over the opposite end of the motor;
  the motor housing portion being formed in part by a structure integral with the flange portion and in part by the cover;
  a first cooling air path defined by the flange portion and by the cover, the first cooling air path having
    a cooling air path inlet that is located in the surface of the flange portion and that communicates with the space,
    a cooling air path outlet communicating with the motor airflow path inlet,
    an upstream portion of the first cooling air path that extends radially inwardly and axially in the direction from the opposite end of the motor toward the drive end of the motor, the upstream portion of the first cooling air path being defined in part by a ramped surface on the cover, the upstream portion including a wall that extends toward and terminates at a point spaced from the ramped surface, the upstream portion including a dam that extends upwardly from the ramped surface, the dam and the wall resisting downstream water flow in the first cooling air path, and the upstream portion having a low point adjacent the cooling air path inlet and having a high point adjacent the downstream end of the upstream portion, the high point being defined by the dam, and wherein a line from the low point to the high point defines an angle of greater than approximately ten degrees with respect to horizontal, and
    a downstream portion of the first cooling air path that extends axially in the direction from the drive end of the motor toward the opposite end of the motor, the downstream portion of the first cooling air path extending substantially the entire length of motor, and
  a second cooling air path in the housing structure communicating between the motor airflow path outlet and the axial gap.

41. A method of mounting a centrifugal blower in a vehicle, the method comprising:
  providing a centrifugal blower having
    a centrifugal fan including a hub adapted for rotation about a central axis, and a plurality of blades coupled for rotation with the hub;
    a motor having a drive end and an opposite end, the motor including a drive shaft drivingly connected to the hub of the centrifugal fan, the drive shaft extending from the drive end of the motor, and the motor having therethrough an airflow path for cooling the motor, the airflow path having an inlet near the opposite end of the motor; and
    a housing structure including
      a blower housing portion at least partially defining a space in which the fan is substantially enclosed, the space having an inlet and an outlet;
      a motor housing portion supporting the motor;
      a flange portion at least partially supporting the motor housing portion on the blower housing portion; and
      a cooling air path having an inlet communicating with the space and an outlet communicating with the inlet of the motor airflow path, the cooling air path having an upstream portion that extends axially in the direction from the opposite end of the motor toward the drive end of the motor, and the cooling air path having a downstream portion that extends axially in the direction from the drive end of the motor toward the opposite end of the motor; and
  mounting the blower in a vehicle such that the central axis extends non-vertically and non-horizontally, and such that the inlet of the cooling air path is substantially directly below the central axis.

42. The method of claim 41 wherein the central axis lies in a vertical plane, wherein the central axis also lies in a second plane intersecting the inlet of the cooling air path, and wherein mounting the blower includes orienting the second plane at an angle relative to the vertical plane less than about fifteen degrees.

43. The method of claim 42 wherein mounting the blower includes orienting the blower such that the vertical plane intersects the inlet of the cooling air path.

44. A centrifugal blower comprising:
  a centrifugal fan including a hub adapted for rotation about a central axis, and a plurality of blades coupled for rotation with the hub;
  a motor having a drive end and an opposite end, the motor including a drive shaft drivingly connected to the hub of the centrifugal fan, the drive shaft extending from the drive end of the motor, and the motor having therethrough a motor airflow path for cooling the motor, the motor airflow path having an inlet near the opposite end of the motor; and
  a housing structure including
    a blower housing portion at least partially defining a space in which the fan is substantially enclosed, the space having a blower inlet and a blower outlet;
    a motor housing portion supporting the motor;
    a flange portion at least partially supporting the motor housing portion on the blower housing portion; and
    a cooling air path having a cooling air path inlet communicating with the space and a cooling air path outlet communicating with the inlet of the motor airflow path, the cooling air path having an upstream portion that extends axially in the direction from the opposite end of the motor toward the drive end of the motor, and the cooling air path having a downstream portion that extends axially in the direction from the drive end of the motor toward the opposite end of the motor;
  wherein at least part of the motor housing portion is separate from the flange portion, wherein the motor housing portion is formed in part by a structure integral with the flange portion and in part by a separate cover which extends in part over the opposite end of the motor, and wherein the cooling air path is defined by the flange portion and by the separate cover.

45. A centrifugal blower comprising:
  a centrifugal fan including a hub adapted for rotation about a central axis, and a plurality of blades coupled for rotation with the hub;

a motor having a drive end and an opposite end, the motor including a drive shaft drivingly connected to the hub of the centrifugal fan, the drive shaft extending from the drive end of the motor, and the motor having therethrough a motor airflow path for cooling the motor, the motor airflow path having an inlet near the opposite end of the motor; and a housing structure including
- a blower housing portion at least partially defining a space in which the fan is substantially enclosed, the space having a blower inlet and a blower outlet;
- a motor housing portion supporting the motor;
- a flange portion at least partially supporting the motor housing portion on the blower housing portion; and
- a first cooling air path having a cooling air path inlet communicating with the space and a cooling air path outlet communicating with the inlet of the motor airflow path, the first cooling air path having an upstream portion that extends axially in the direction from the opposite end of the motor toward the drive end of the motor, and the first cooling air path having a downstream portion that extends axially in the direction from the drive end of the motor toward the opposite end of the motor;

wherein the motor airflow path has an outlet near the drive end of the motor, wherein the flange portion and the hub define therebetween an axial gap, and wherein the housing structure also includes a second cooling air path communicating between the outlet of the motor airflow path and the axial gap.

46. A centrifugal blower comprising:

a centrifugal fan including a hub adapted for rotation about a central axis, and a plurality of blades coupled for rotation with the hub;

a motor having a drive end and an opposite end, the motor including a drive shaft drivingly connected to the hub of the centrifugal fan, the drive shaft extending from the drive end of the motor, and the motor having therethrough a motor airflow path for cooling the motor, the motor airflow path having an inlet near the opposite end of the motor; and a housing structure including
- a blower housing portion at least partially defining a space in which the fan is substantially enclosed, the space having a blower inlet and a blower outlet;
- a motor housing portion supporting the motor;
- a flange portion at least partially supporting the motor housing portion on the blower housing portion; and
- a cooling air path having a cooling air path inlet communicating with the space and a cooling air path outlet communicating with the inlet of the motor airflow path, the cooling air path having an upstream portion that extends axially in the direction from the opposite end of the motor toward the drive end of the motor, and the cooling air path having a downstream portion that extends axially in the direction from the drive end of the motor toward the opposite end of the motor;

wherein the upstream portion of the cooling air path is defined in part by a ramped surface, and wherein the ramped surface is on the motor housing portion.

47. A centrifugal blower comprising:

a centrifugal fan including a hub adapted for rotation about a central axis, and a plurality of blades coupled for rotation with. the hub;

a motor having a drive end and an opposite end, the motor including a drive shaft drivingly connected to the hub of the centrifugal fan, the drive shaft extending from the drive end of the motor, and the motor having therethrough a motor airflow path for cooling the motor, the motor airflow path having an inlet near the opposite end of the motor; and a housing structure including
- a blower housing portion at least partially defining a space in which the fan is substantially enclosed, the space having a blower inlet and a blower outlet;
- a motor housing portion supporting the motor;
- a flange portion at least partially supporting the motor housing portion on the blower housing portion; and
- a cooling air path having a cooling air path inlet communicating with the space and a cooling air path outlet communicating with the inlet of the motor airflow path, the cooling air path having an upstream portion that extends axially in the direction from the opposite end of the motor toward the drive end of the motor, and the cooling air path having a downstream portion that extends axially in the direction from the drive end of the motor toward the opposite end of the motor;

wherein the upstream portion of the cooling air path includes a wall that extends generally axially in the direction from the drive end of the motor toward the opposite end of the motor and that resists downstream water flow in the cooling air path, wherein the upstream portion of the cooling air path includes a raised dam that resists downstream water flow in the cooling air path, wherein upstream portion of the cooling air path is defined in part by a ramped surface, wherein the dam extends upwardly from the ramped surface, and wherein the wall extends toward and terminates at a point spaced from the ramped surface.

48. A centrifugal blower comprising:

a centrifugal fan including a hub adapted for rotation about a central axis, and a plurality of blades coupled for rotation with the hub;

a motor having a drive end and an opposite end, the motor including a drive shaft drivingly connected to the hub of the centrifugal fan, the drive shaft extending from the drive end of the motor, and the motor having therethrough a motor airflow path for cooling the motor, the motor airflow path having an inlet near the opposite end of the motor; and a housing structure including
- a blower housing portion at least partially defining a space in which the fan is substantially enclosed, the space having a blower inlet and a blower outlet;
- a motor housing portion supporting the motor;
- a flange portion at least partially supporting the motor housing portion on the blower housing portion; and
- a cooling air path having a cooling air path inlet communicating with the space and a cooling air path outlet communicating with the inlet of the motor airflow path, the cooling air path having an upstream portion that extends axially in the direction from the opposite end of the motor toward the drive end of the motor, and the cooling air path having a downstream portion that extends axially in the direction from the drive end of the motor toward the opposite end of the motor;

wherein the housing structure includes a surface that extends generally parallel to the central axis, wherein the cooling air path inlet is in the surface, wherein the surface is on the flange portion, wherein the surface has upper and lower ends, the upper end being spaced from the lower end in the direction from the opposite end of the motor toward the drive end of the motor, and wherein the cooling air path inlet is located adjacent the upper end.

49. A centrifugal blower comprising:

a centrifugal fan including a hub adapted for rotation about a central axis, and a plurality of blades coupled for rotation with the hub;

a motor having a drive end and an opposite end, the motor including a drive shaft drivingly connected to the hub of the centrifugal fan, the drive shaft extending from the drive end of the motor, and the motor having therethrough a motor airflow path for cooling the motor, the motor airflow path having an inlet near the opposite end of the motor; and a housing structure including
   a blower housing portion at least partially defining a space in which the fan is substantially enclosed, the space having a blower inlet and a blower outlet;
   a motor housing portion supporting the motor;
   a flange portion at least partially supporting the motor housing portion on the blower housing portion; and
   a cooling air path having a cooling air path inlet communicating with the space and a cooling air path outlet communicating with the inlet of the motor airflow path, the cooling air path having an upstream portion that extends axially in the direction from the opposite end of the motor toward the drive end of the motor, and the cooling air path having a downstream portion that extends axially in the direction from the drive end of the motor toward the opposite end of the motor;

wherein the housing structure includes a surface that extends generally parallel to the central axis, wherein the cooling air path inlet is in the surface, wherein the surface is on the flange portion, wherein the surface has upper and lower ends, the upper end being spaced from the lower end in the direction from the opposite end of the motor toward the drive end of the motor, and wherein the cooling air path inlet is located adjacent the lower end.

50. A centrifugal blower comprising:

a centrifugal fan including a hub adapted for rotation about a central axis, and a plurality of blades coupled for rotation with the hub;

a motor having a drive end and an opposite end, the motor including a drive shaft drivingly connected to the hub of the centrifugal fan, the drive shaft extending from the drive end of the motor, and the motor having therethrough a motor airflow path for cooling the motor, the motor airflow path having an inlet near the opposite end of the motor; and a housing structure including
   a blower housing portion at least partially defining a space in which the fan is substantially enclosed, the space having a blower inlet and a blower outlet;
   a motor housing portion supporting the motor;
   a flange portion at least partially supporting the motor housing portion on the blower housing portion; and
   a cooling air path having a cooling air path inlet communicating with the space and a cooling air path outlet communicating with the inlet of the motor airflow path, the cooling air path having an upstream portion that extends axially in the direction from the opposite end of the motor toward the drive end of the motor, and the cooling air path having a downstream portion that extends axially in the direction from the drive end of the motor toward the opposite end of the motor;

wherein, when the central axis is vertical, the upstream portion of the cooling air path has a low point adjacent the cooling air path inlet and has a high point adjacent a downstream end of the upstream portion, and wherein a line from the low point to the high point defines an angle of greater than approximately ten degrees with respect to horizontal.

51. A centrifugal blower comprising:

a centrifugal fan including a hub adapted for rotation about a central axis, and a plurality of blades coupled for rotation with the hub;

a motor having a drive end and an opposite end, the motor including a drive shaft drivingly connected to the hub of the centrifugal fan, the drive shaft extending from the drive end of the motor, and the motor having therethrough a motor airflow path for cooling the motor, the motor airflow path having an inlet near the opposite end of the motor; and a housing structure including
   a blower housing portion at least partially defining a space in which the fan is substantially enclosed, the space having a blower inlet and a blower outlet;
   a motor housing portion supporting the motor;
   a flange portion at least partially supporting the motor housing portion on the blower housing portion; and
   a cooling air path having a cooling air path inlet communicating with the space and a cooling air path outlet communicating with the inlet of the motor airflow path, the cooling air path having an upstream portion that extends axially in the direction from the opposite end of the motor toward the drive end of the motor, and the cooling air path having a downstream portion that extends axially in the direction from the drive end of the motor toward the opposite end of the motor;

wherein, when the central axis is vertical, the upstream portion of the cooling air path has a low point adjacent the inlet and has a high point adjacent a downstream end of the upstream portion, and wherein a line from the low point to the high point defines an angle of greater than approximately twenty-five degrees with respect to horizontal.

52. A centrifugal blower comprising:

a centrifugal fan including a hub adapted for rotation about a central axis, and a plurality of blades coupled for rotation with the hub;

a motor having a drive end and an opposite end, the motor including a drive shaft drivingly connected to the hub of the centrifugal fan, the drive shaft extending from the drive end of the motor, and the motor having therethrough a motor airflow path for cooling the motor, the motor airflow path having an inlet near the opposite end of the motor; and a housing structure including
   a blower housing portion at least partially defining a space in which the fan is substantially enclosed, the space having a blower inlet and a blower outlet;
   a motor housing portion supporting the motor;
   a flange portion at least partially supporting the motor housing portion on the blower housing portion; and
   a cooling air path having a cooling air path inlet communicating with the space and a cooling air path outlet communicating with the inlet of the motor airflow path, the cooling air path having an upstream portion that extends axially in the direction from the opposite end of the motor toward the drive end of the motor, and the cooling air path having a downstream portion that extends axially in the direction from the drive end of the motor toward the opposite end of the motor;

wherein the motor housing portion is formed in part by a structure integral with the flange portion and in part by a separate cover which extends in part over the opposite end of the motor, and wherein the cooling air path is defined by the flange portion and by the separate cover.

53. A centrifugal blower comprising:

a centrifugal fan including a hub adapted for rotation about a central axis, and a plurality of blades coupled for rotation with the hub;

a motor having a drive end and an opposite end, the motor including a drive shaft drivingly connected to the hub of the centrifugal fan, the drive shaft extending from the drive end of the motor, and the motor having therethrough a motor airflow path for cooling the motor, the motor airflow path having an inlet near the opposite end of the motor; and a housing structure including a blower housing portion at least partially defining a space in which the fan is substantially enclosed, the space having a blower inlet and a blower outlet;

a motor housing portion supporting the motor;

a flange portion at least partially supporting the motor housing portion on the blower housing portion; and a cooling air path having a cooling air path inlet communicating with the space and a cooling air path outlet communicating with the inlet of the motor airflow path, the cooling air path having an upstream portion that extends axially in the direction from the opposite end of the motor toward the drive end of the motor, and the cooling air path having a downstream portion that extends axially in the direction from the drive end of the motor toward the opposite end of the motor;

wherein the motor housing portion is integral with the flange portion and includes a cover which extends over the opposite end of the motor, and wherein the cooling air path is defined by the flange portion.

* * * * *